United States Patent [19]

Nunes

[11] Patent Number: 5,304,004
[45] Date of Patent: Apr. 19, 1994

[54] THERMOMETER MOVEMENT CAP NUT ASSEMBLY

[76] Inventor: Brendon G. Nunes, 467 Westney Rd., South, Unit 3, Ajax, Ontario, Canada, L1S 6V7

[21] Appl. No.: 14,234

[22] Filed: Feb. 5, 1993

[51] Int. Cl.⁵ .......................... G01K 1/14; G01K 5/70
[52] U.S. Cl. .................................. 374/208; 374/206; 411/339
[58] Field of Search ................ 411/338, 339; 374/205, 374/206, 207, 208

[56] References Cited

U.S. PATENT DOCUMENTS

| | | | |
|---|---|---|---|
| 2,058,718 | 10/1936 | Peterson | 411/338 |
| 2,118,561 | 5/1938 | Kleeberg | 411/338 |
| 2,154,012 | 4/1939 | Rhodes | 411/339 |
| 2,597,939 | 5/1952 | Lamb | 374/207 |
| 2,706,962 | 4/1955 | Kebbon | 374/207 |
| 2,797,605 | 7/1957 | Metze, Jr. et al. | 411/339 |
| 3,494,246 | 2/1970 | Hensley | 411/339 |
| 3,603,151 | 9/1971 | Zurstadt | 374/207 |
| 4,121,463 | 10/1978 | Argabrite | 374/206 |
| 4,749,281 | 6/1988 | Nunes | 374/206 |
| 5,069,586 | 12/1991 | Casey | 411/339 |

FOREIGN PATENT DOCUMENTS

| | | | |
|---|---|---|---|
| 0804871 | 5/1951 | Fed. Rep. of Germany | 411/339 |
| 0821444 | 11/1951 | Fed. Rep. of Germany | 411/339 |
| 1450815 | 8/1966 | France | 374/207 |

Primary Examiner—Diego F. F. Gutierrez
Attorney, Agent, or Firm—Nixon & Vanderhye

[57] ABSTRACT

A cap nut and arbor subassembly for an instrument, such as a thermometer, barometer or wind speed indicator, allow an indicator hand to be quickly, positively, and inexpensively held in place. The cap nut and arbor are of plastic, such as high impact styrene, and have an interference fit provided by an elongated projection extending from the cap received within an axially elongated opening in the arbor.

14 Claims, 2 Drawing Sheets

5,304,004

THERMOMETER MOVEMENT CAP NUT ASSEMBLY

BACKGROUND AND SUMMARY OF THE INVENTION

In the construction and assembly of instrument movements having indicator hands, such as thermometers, barometers, wind speed indicators, etc., it is highly desirable to be able to quickly and positively place an indicator hand in operative association with the instrument movement. It is also highly desirable to do this is in an inexpensive manner. However, many conventional commercial techniques, such as the utilization of a threaded brass arbor and internally threaded brass cap nut, are both expensive and time consuming to assemble.

According to the present invention, a cap nut for an instrument having an indicator hand, as well as a subassembly for such an instrument, and related assembly, allow not only quick assembly of an indicator hand to the instrument, but do so in an inexpensive manner. By practicing the invention the assembly time may be reduced by about 15 to 20 seconds compared to an assembly with conventional brass threaded arbors and cap nuts, and the cost can be reduced to only a fraction of the cost of such an arbor and cap nut.

According to one aspect of the present invention an assembly for an instrument having an indicator hand is provided. The assembly comprises the following elements: A plastic arbor. A plastic cap nut. An indicator hand adapted to be held in a predetermined position by the arbor and the cap nut. And, non-threaded engagement means of the arbor and the cap nut for holding the arbor and cap nut together, to in turn hold the indicator hand in place. The cap nut may be an integral body of plastic such as styrene, with a substantially continuous surface at a first side, and a recess in the second side, with an elongated projection extending out from the recess. The arbor also may be of high impact styrene, and have an elongated axially extending opening at one end and slotted at the other end. The cap projection is preferably smooth surfaced and circular in cross-section, having a maximum diameter of about one-fifth to one-sixth of the diameter of the integral body of plastic.

According to another aspect of the present invention a subassembly for an instrument is provided. The subassembly comprises the following components: An indicator hand having means defining an opening therein. An arbor having a first portion thereof which is dimensioned and shaped to fit through the opening. A cap nut. And, interference fit surface manifestations formed on the arbor and the cap nut to allow the cap nut and arbor to be quickly assembled, and to hold the indicator hand in a predetermined position with respect to the arbor and cap nut when the arbor passes through the opening in the indicator hand.

Still further the invention contemplates a cap nut per se. The cap nut comprises: An integral body of plastic. Means defining a substantially continuous surface at a first side of the body. Means defining a recess at a second side of the body, opposite the first side. And, an elongated projection extending out from the recess along a central axis of the body substantially concentric with the recess and the substantially continuous surface.

It is the primary object of the present invention to provide an easy to assemble press-on cap nut and arbor assembly that it is also inexpensive. This and other objects of the invention will become clear from an inspection of the detailed description of the invention and from the appended claims.

DETAILED DESCRIPTION OF THE DRAWINGS

Figure 1:
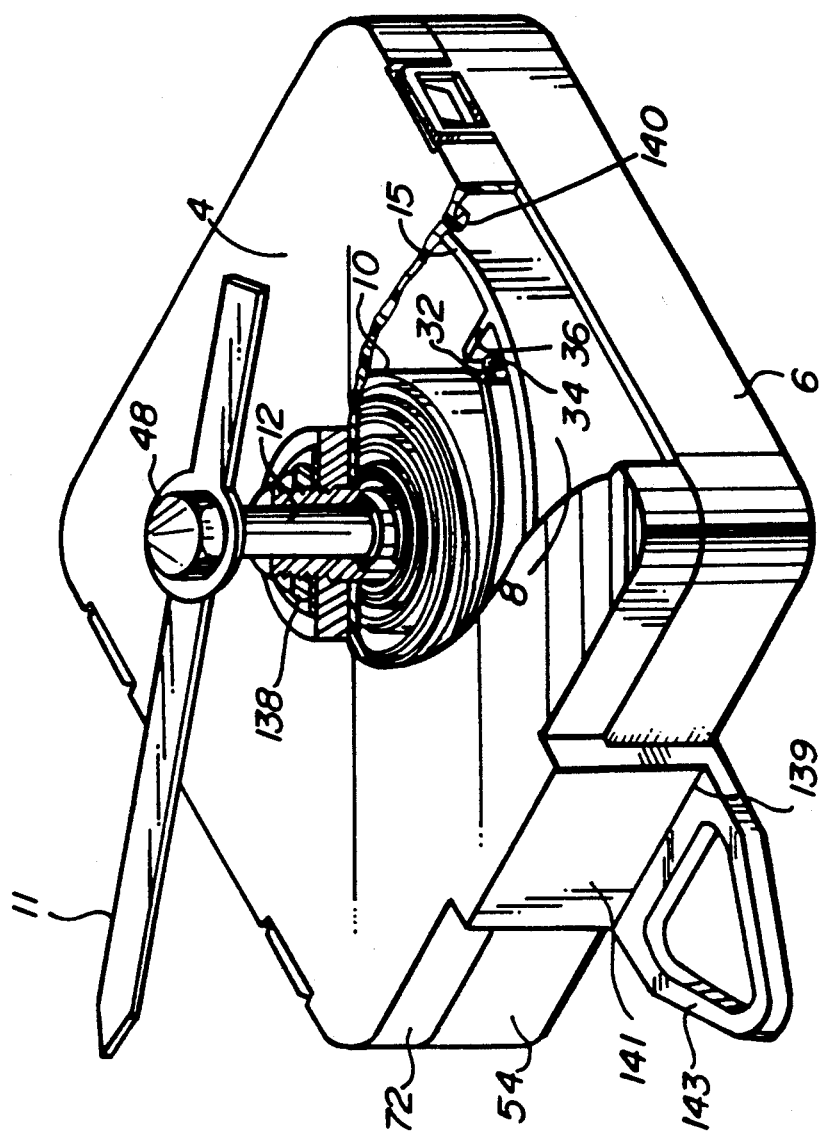
FIG. 1 is a top perspective view of a thermometer movement having an exemplary arbor and cap nut assembly according to the present invention.
Figure 2:
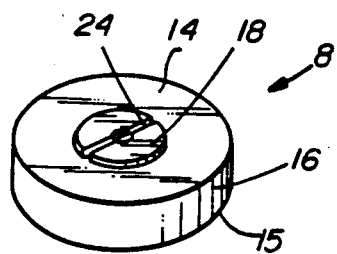
FIG. 2 is a is a bottom perspective view of the coil support member of the movement of FIG. 1.

An exemplary universal thermometer movement with which the cap nut and arbor assembly according to the invention may be utilized, is shown in FIGS. 1 and 2, and is basically the same as that shown in U.S. Pat. No. 4,749,281, the disclosure of which is hereby incorporated by reference herein. The movement includes a casing having a top 4 and bottom 6, with a drum shaped coil support member 8 adapted to be rotatably sandwiched between the top and bottom parts 4, 6, and a bimetal coil element 10 disposed within the coil support member 8. An arbor 12 upstands from the coil 10 and includes an indicator hand 11 mounted thereon.

The bimetallic coil element 10 has a U-shaped portion 32 hooked around pin 34 which is adjacent the inwardly extending wall 36 which serves as an abutment surface for a U-shaped portion 32 of the coil 10. The base portion 14 (see FIG. 2) has a peripheral wall 16 and includes an upper edge 15 with a groove 24 for receiving a screwdriver or the like to allow rotation of the coil support member 8 and thereby the calibration of the movement device. The casing also includes wall portions 54, 72, with a projection 141 extending along side portion 72 and having a generally triangular hook 143 from the outermost edge 139 thereof.

What has been described heretofore is as shown in U.S. Pat. No. 4,749,281. According to the invention the arbor 12 and cap nut 48 are significantly different than those illustrated in U.S. Pat. No. 4,749,281.

Figure 5:
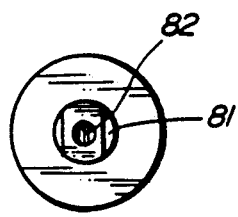
FIG. 5 is a top plan view of the arbor of FIGS. 1 and 3.

The arbor 12 includes a first end 81 having an opening 82 therein (see FIG. 5) which is elongated and extends axially, and has a second end with a slot 80. The arbor 12 is made of a plastic material, such as super high impact styrene.

Figure 3:
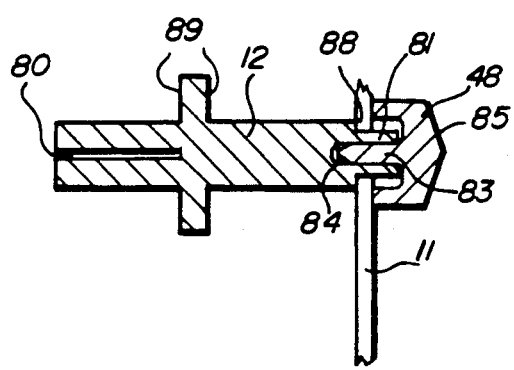
FIG. 3 is a side cross-sectional view, with a portion of the indicator cut away, of the arbor and cap nut of FIG. 1 when assembled.
Figure 4:
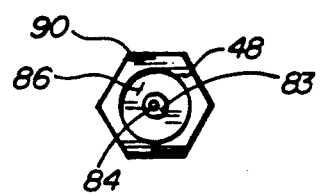
FIG. 4 is a bottom plan view of the cap nut of FIGS. 1 and 3.

The cap 48 is an integral plastic body having means defining a substantially continuous surface (e.g. conical surface 85) at one end thereof, with means defining a recess 86 at a second side of the integral plastic body that forms the cap 48. An elongated projection 83, which may be tapered inwardly in a conical manner at the end thereof, as indicated by 84 in FIGS. 3 and 4, extends outwardly from the body of the cap nut 48 along a central axis substantially concentric with the recess 86 and surface 85. Preferably both the cap 48 and the projection 83 are generally circular in cross-section (the body of cap 48 hexagonal in the embodiment illustrated in FIGS. 3 and 4), with the projection 83 having a diameter between about one-fifth and one-sixth (e.g.

two-elevenths) of the diameter of the cap body 48 (or a projection thereof). The outer surface of the projection 83 is also preferably smooth (e.g. non-threaded). The plastic cap 48 also is preferably made of super high impact styrene.

The projection 83 and the opening 82 form a press or interference fit, to hold the components tightly together. Since an interference fit is provided rather than screw threading, the structure may be assembled much more quickly than the typical cap nut arrangement such as shown in U.S. Pat. No. 4,749,281. Also since the components are of plastic they are much less expensive than the brass that they replace.

Note that the arbor 12 has shoulders 88 and 89, the shoulder 88 engaging the indicator hand 11 (which has a central opening therein which passes over the cylindrical first end 81 of the arbor 12). The indicator hand 11 also is engaged by the second end face 90 of the cap nut 48. The shoulder 89 is for mounting the arbor with respect to the coil 10 so that it is properly positioned for operation.

While the structure as described above is particularly illustrated with respect to a thermometer movement, it is to be understood that the arbor 12 and cap 48 arrangement may be used with a number of other instruments too, such as a barometer, wind speed indicator, or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly for an instrument having an indicator hand, comprising:
    a plastic arbor;
    a plastic cap nut;
    the indicator hand being held in a predetermined position by said arbor and said cap nut; and
    non-threaded engagement means of said arbor and said cap nut for holding said arbor and cap nut together, to in turn hold said indicator hand in place.

2. An assembly as recited in claim 1 wherein said plastic cap nut comprises an integral body of plastic; means defining a substantially continuous surface at a first side of said body; means defining a second side of said body, opposite said first side; and wherein said non-threaded engagement means includes an elongated projection extending out from said second end of said body along a central axis of said body substantially concentric with said substantially continuous surface.

3. An assembly as recited in claim 2 wherein said arbor comprises an integral body of plastic.

4. An assembly as recited in claim 3 wherein said plastic of said arbor and said cap nut comprises high impact styrene.

5. A assembly as recited in claim 3 wherein said arbor has first and second ends, said non-threaded engagement means including an elongated axially extending opening provided at said first end, and said second end being slotted; and further comprising first and second shoulders, said first shoulder being disposed adjacent said first end of said arbor for engaging said indicator hand, and said second shoulder being closer to said second end than said first end.

6. An assembly as recited in claim 2 wherein said body is generally circular in cross section, said body having a maximum diameter between about five and six times the maximum diameter of said projection.

7. An assembly as recited in claim 1 in combination with said instrument, said instrument comprising a thermometer movement.

8. A subassembly for an instrument, comprising:
    an indicator hand having means defining an opening therein;
    an arbor having a first portion thereof which is dimensioned and shaped to fit through said opening;
    a cap nut; and
    interference fit surface manifestations formed on said arbor and said cap nut to allow said cap nut and arbor to be quickly assembled, and to hold said indicator hand in a predetermined position with respect to said arbor and cap nut when said arbor passes through said opening in said indicator hand.

9. A subassembly as recited in claim 8 wherein said cap nut comprises an integral body of plastic having means defining a substantially continuous surface at a first side thereof and means for defining a second side thereof, opposite said first side; and wherein said interference fit surface manifestations include an elongated projection extending out from said second side of said cap nut integral body along a central axis of said body substantially concentric with said substantially continuous surface, and further comprises means defining an elongated axial opening in said arbor.

10. A subassembly as recited in claim 9 wherein said arbor comprises an integral body of plastic.

11. A subassembly as recited in claim 10 wherein said plastic of said arbor and said cap nut comprises high impact styrene.

12. A subassembly as recited in claim 11 wherein said arbor has first and second ends, said elongated axially extending opening being provided at said first end, and said second end being slotted; and further comprising first and second shoulders, said first shoulder being disposed adjacent said first end of said arbor for engaging said indicator hand, and said second shoulder being closer to said second end than said first end.

13. A subassembly as recited in claim 10 wherein said arbor has first and second ends, said elongated axially extending opening being provided at said first end, and said second end being slotted; and further comprising first and second shoulders, said first shoulder being disposed adjacent said first end of said arbor for engaging said indicator hand, and said second shoulder being closer to said second end than said first end.

14. A subassembly as recited in claim 8 wherein said arbor has first and second ends, an elongated axially extending opening being provided at said first end, and said second end being slotted; and further comprising first and second shoulders, said first shoulder being disposed adjacent said first end of said arbor for engaging said indicator hand, and said second shoulder being closer to said second end than said first end.

* * * * *